United States Patent [19]

Funk, Jr. et al.

[11] 4,182,956
[45] Jan. 8, 1980

[54] OPTICAL LIGHT PEN

[75] Inventors: James B. Funk, Jr., Fairfield, Conn.; Walter R. Linke, Chicago, Ill.

[73] Assignee: DeVar Inc., Bridgeport, Conn.

[21] Appl. No.: 547,305

[22] Filed: Feb. 5, 1975

Related U.S. Application Data

[63] Continuation-in-part of Ser. No. 457,000, Apr. 1, 1974, abandoned.

[51] Int. Cl.$^2$ ............................................... H01J 5/02
[52] U.S. Cl. ..................................... 250/239; 250/227; 250/568
[58] Field of Search ............... 250/227, 566, 568, 239, 250/216, 570, 567; 178/DIG. 2; 235/61.11 E

[56] References Cited

U.S. PATENT DOCUMENTS

| | | | |
|---|---|---|---|
| 3,247,391 | 4/1966 | Ogle et al. | 250/239 X |
| 3,465,158 | 9/1969 | Foerster | 250/227 X |
| 3,509,353 | 4/1970 | Sundblad et al. | 250/239 X |
| 3,561,846 | 2/1971 | Kingsland | 250/566 |
| 3,716,699 | 2/1973 | Eckert et al. | 235/61.11 E |
| 3,727,030 | 4/1973 | McMurtry | 250/566 X |
| 3,819,938 | 6/1974 | Kornrumpf et al. | 250/553 |
| 3,868,514 | 2/1975 | Israelsson | 250/239 X |

*Primary Examiner*—David K. Moore
*Attorney, Agent, or Firm*—Vogel, Dithmar, Stotland, Stratman & Levy

[57] ABSTRACT

The pen comprises an elongated housing having a light aperture at one end. A plurality of light-emitting diodes is mounted in the housing, and means are provided for focusing the light from such diodes at the light aperture. In use, the pen is held against a coded label and moved therealong. Light from the light-emitting diodes strikes the coded information, so as to produce a light pattern. Lenses in the housing focus the reflected light onto a detector which produces electrical signals in accordance with the light pattern.

3 Claims, 11 Drawing Figures

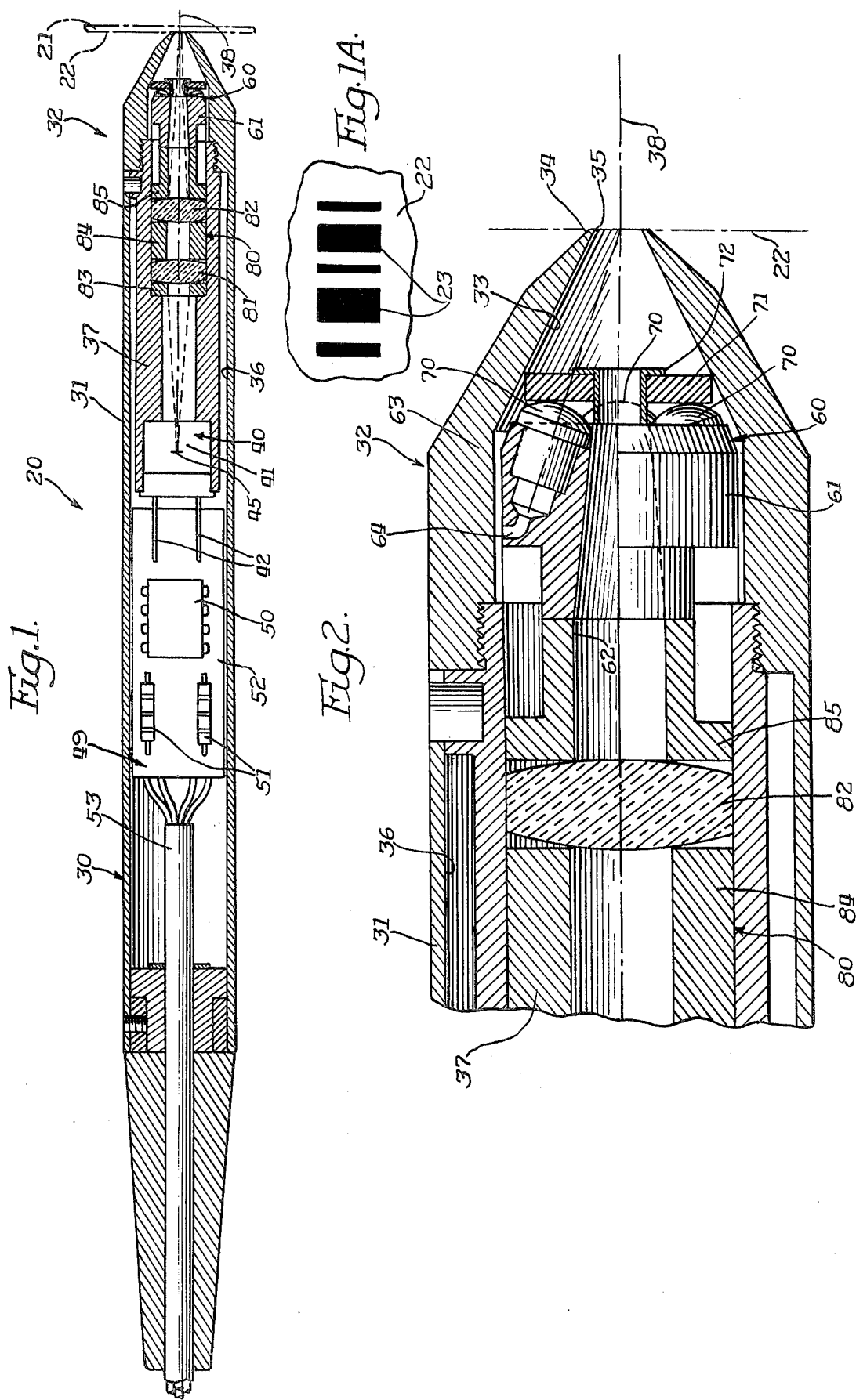

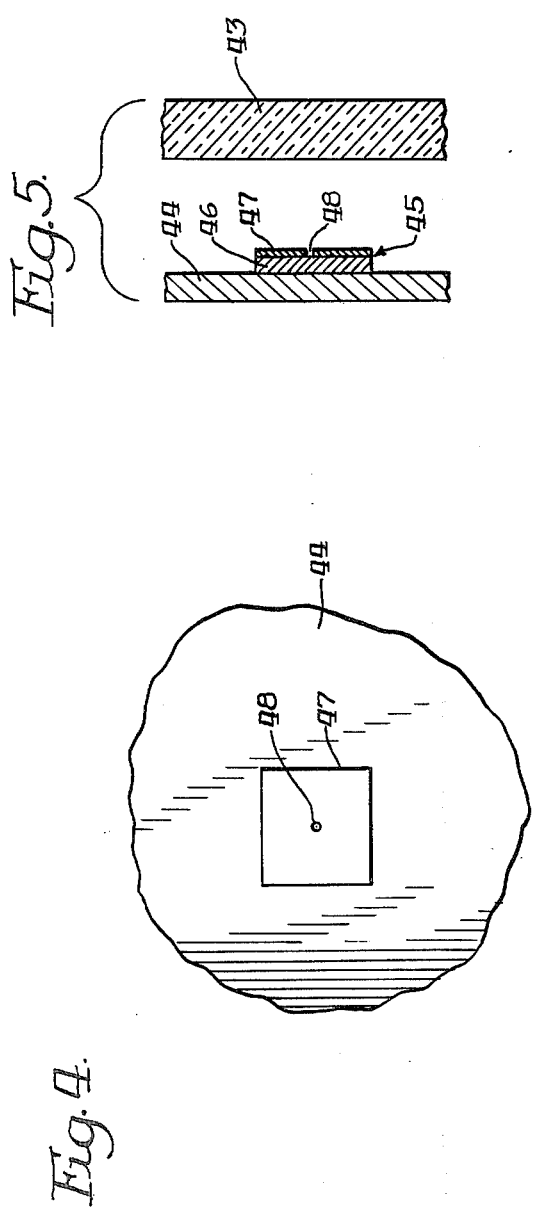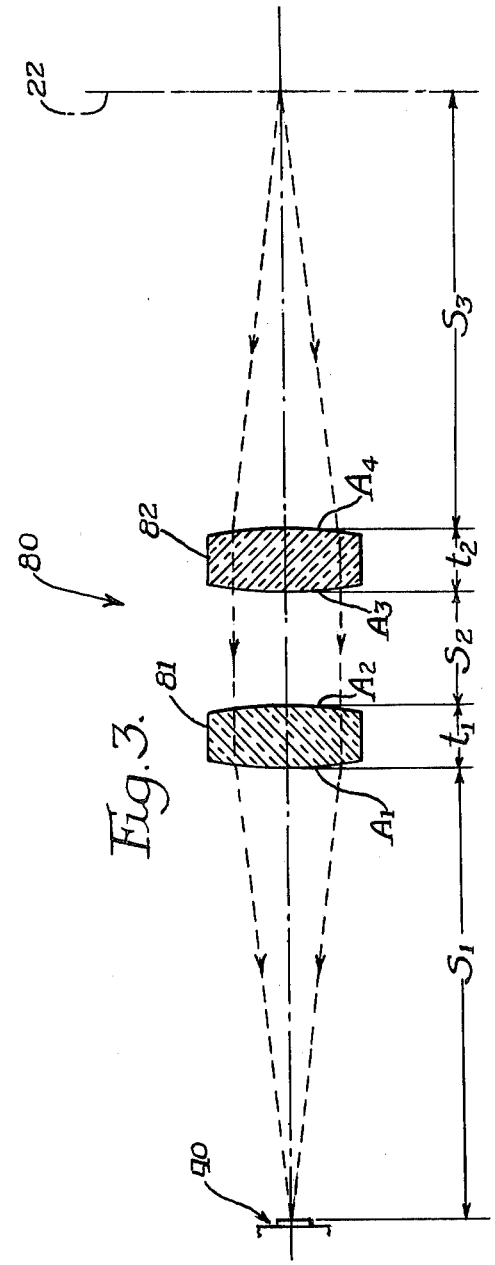

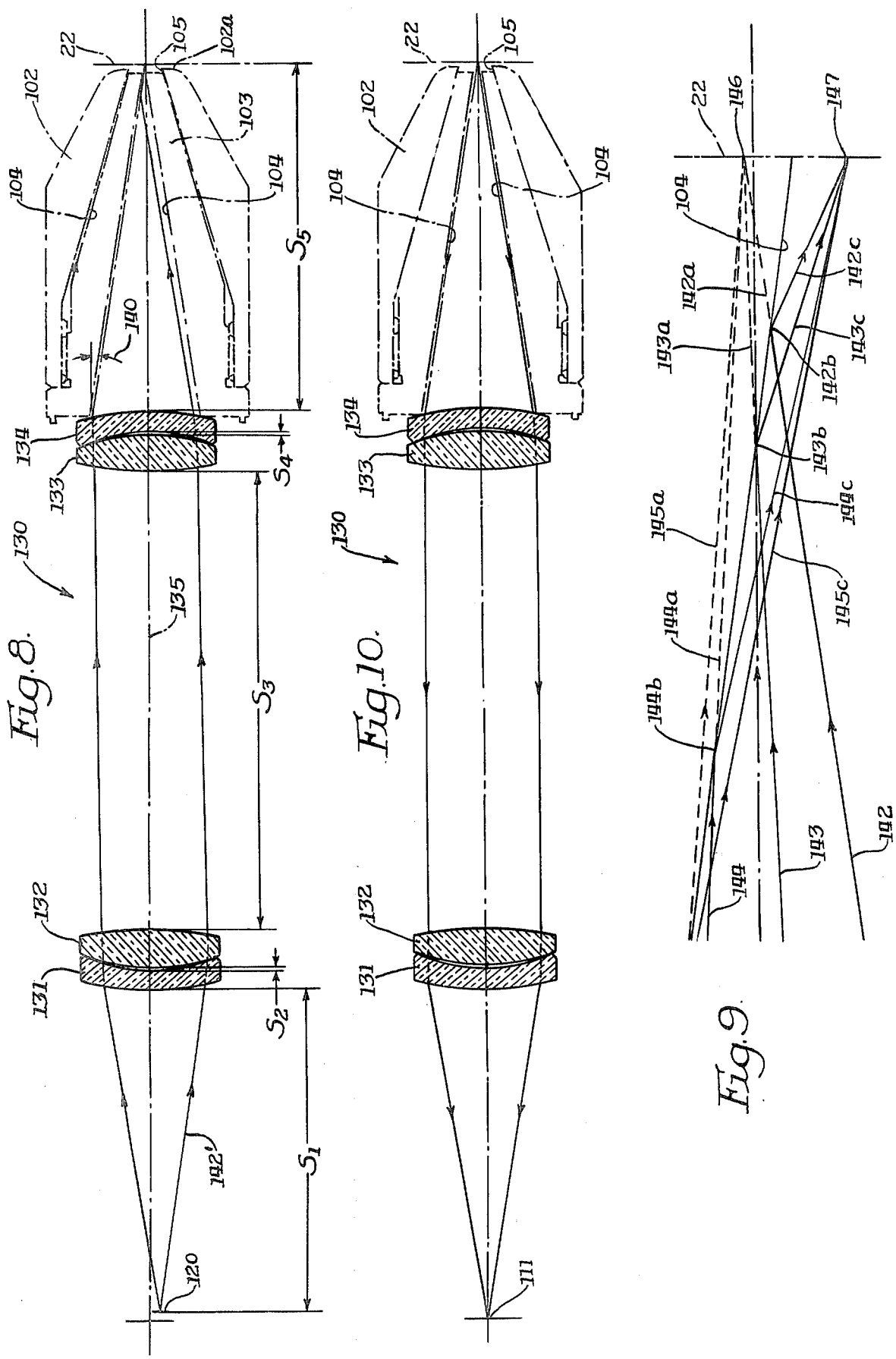

OPTICAL LIGHT PEN

CROSS REFERENCE TO RELATED APPLICATIONS

The present application is a continuation-in-part of application Ser. No. 457,000 for OPTICAL LIGHT PEN, filed Apr. 1, 1974 and now abandoned.

BACKGROUND OF THE INVENTION

Optical light pens of the type disclosed in this application find use in "reading" coded information appearing on the label of an item. If the items are sold in a retail store, the person who checks out the item has such an optical pen which is pressed against the label and moved along the coded information on the label. The pen "reads" the code and provides input to a computer terminal representative of the code. Such terminal may produce a printed tape for the customer, inventory information for a remotely located computer, etc.

One type of code suitable for retail stores consists of a set of nonreflecting bars on a reflecting label (or alternatively reflecting bars on a nonreflecting label). A bar pattern is established to correspond to each of the ten basic numerals.

Such optical pens typically have a light source which generates light intended to strike the region of the code. When the light strikes a nonreflecting bar, no light is reflected, while, if the light strikes a reflecting bar, light is reflected back into the pen. Thus, by moving the pen across the bar pattern, light fluctuations are produced, representative of the presence and absence of bars and their respective widths. The reflected light is sensed by a detector which converts the light information into electrical signals for further processing by the computer terminal.

Presently available light pens use an incandescent lamp as the light source. Disadvantages associated with the use of such a source are limited life of the lamp, heat generation which is detrimental to the pen components and uncomfortable for its user, substantial energy requirements to energize the lamp, and the need to exercise extreme care in handling the pen because of the fragile nature of the lamp filament.

SUMMARY OF THE INVENTION

It is, therefore, an important object of the present invention to provide an optical light pen which does not use an incandescent lamp as its light source, so as not to suffer the above-described disadvantages associated therewith.

Another object is to provide an optical light pen utilizing light-emitting diodes (LED) as the light source, to reduce greatly the amount of heat generated, to reduce the amount of energy required to operate the source, to minimize the care to be exercised, and to increase substantially the life of the light source.

Still another object is to provide an optical light pen which focuses light produced by LEDs onto the label to be read.

In connection with the foregoing object, it is yet another object to enable the user of the optical light pen to hold the same comfortably, that is, to tilt the pen at an angle comfortable to the user, without adversely affecting the resolving capability of the pen.

A further object is to optimize the amount of the reflected light received by the detector in such a pen.

A still further object is to provide a selfcontained optical light pen, which contains the light generator, and also contains the electronic circuitry for processing the optical information applied to the detector.

In summary, there is provided an optical light pen for reading information imprinted on a surface, comprising an elongated housing having means defining a light aperture at one end thereof, the housing being adapted to be positioned so that the light-aperture-defining means is in contact with the imprinted surface and is movable therealong, detector means in the housing for producing electrical signals in response to and in accordance with light received thereby, a plurality of light-emitting diodes in the housing, means for focusing at the light aperture the light from the light-emitting diodes, whereby in use light from the light-emitting diodes will be focused onto the coded information on the imprinted surface, and lens means in the housing for focusing onto the detector means light reflected by the imprinted surface.

In one form of the invention, such focusing means takes the form of a frusto-conical interior reflecting surface for redirecting toward the light aperture the light from each of the light-emitting diodes.

In another specific form of the invention, such focusing means takes the form of a lens associated with each of the light-emitting diodes for focusing the light therefrom at the light aperture.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its construction, and operation, and many of its advantages should be readily understood and appreciated.

FIG. 1 is a view in longitudinal section of an optical light pen incorporating the features of the present invention;

FIG. 1A is a fragmentary plan view of a surface on which is imprinted coded information;

FIG. 2 is an enlarged view of the front of the optical light pen of FIG. 1;

FIG. 3 depicts the lens arrangement of FIG. 1 and ray tracings associated therewith;

FIG. 4 is a plan view on an enlarged scale of the chip in the detector of FIG. 1;

FIG. 5 is a sectional view along the line 5—5 of FIG. 4 and, in addition, depicts the window of such detector;

FIG. 8 depicts the arrangement of the lenses in the optical light pen of FIG. 6, a ray tracing for rays from the light-emitting diodes to the imprinted surface, and, in phantom, the front end of the light pen;

FIG. 9 is a greatly enlarged view of the front end of the conical reflecting surface and depicts the manner by which such reflecting surface deviates the rays so as to focus at the light aperture, and FIG. 10 is a view like FIG. 8, but depicts a ray tracing for rays reflected from the imprinted surface to the detector.

DETAILED DESCRIPTION OF THE PREFERRED EMBODIMENTS

Figure 6:
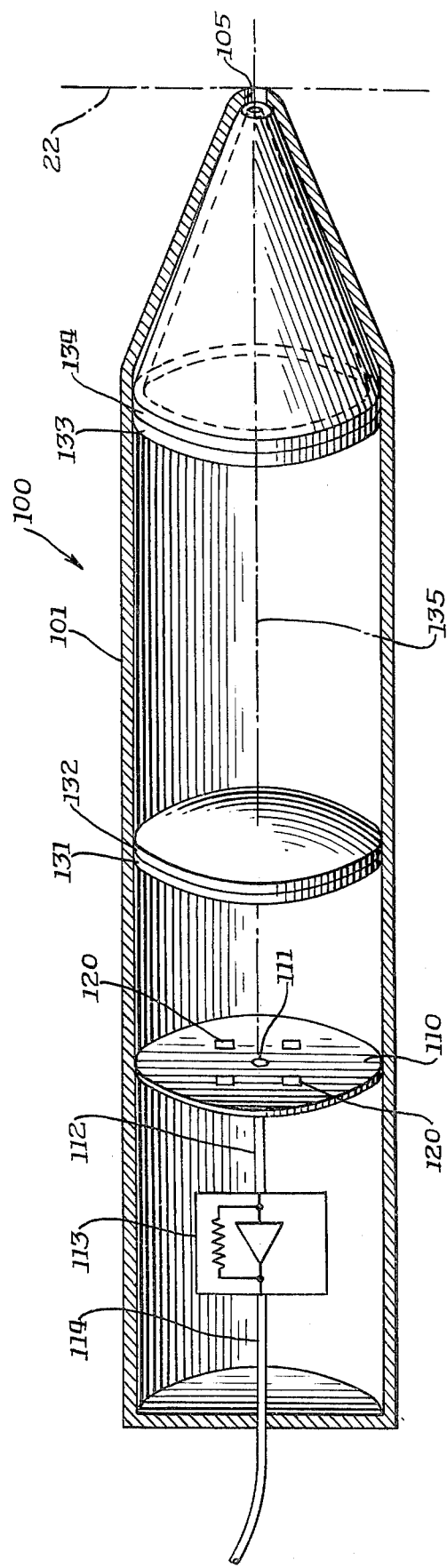
FIG. 6 is a schematic view on an enlarged scale of an optical light pen, constituting a second embodiment of the present invention, and corresponding to FIG. 1 of said previously identified application Ser. No. 457,000.

Turning now to the drawings, and more particularly FIGS. 1 and 2 thereof, there is depicted an optical light pen 20 incorporating the features of the present invention. The pen 20 is used to "read" coded information on the surface 22 of a label 21. Such coded information may take the form of a series of bars on the surface 22. The light pen 20 is of a size to be hand held. The light pen 20 is held by a user in such a way that its tip contacts the surface 22, and is moved therealong, so that it sequentially contacts the bars or coded information 23. The bar pattern depicted in FIG. 1A corresponds to a given numeral, while different bar patterns respectively correspond to the other numerals. In a manner to be presently described, the optical light pen 20 senses the presence and absence of the bars 23 as it is moved along the imprinted surface 22, and produces corresponding electrical signals which are applied to a computer terminal.

The optical light pen 20 comprises a housing 30 which, in turn, includes a long barrel portion 31 having a threaded forward end. The housing 30 also includes an end piece 32 which is threaded and mates with the barrel portion 31, as shown. The end piece 32 has a front part that is generally conical in shape, and also has an interior surface 33 which may be conical in shape, as shown. The end piece 32 has a tip 34 at its forward end, which is adapted to contact the imprinted surface 22 and is constructed of abrasive-resistant material, such as stainless steel or high-molecular-weight polyethylene, so as to withstand the extensive moving contact to which it is subjected during its life. At the center of the tip 34 is a light aperture 35, through which light from the light pen 20 exits and through which light reflected from the imprinted surface 22 enters the pen 20.

The barrel portion 31 and the end piece 32 are hollow and together define a cavity 36. Within the cavity 36 is mounted a sleeve 37. The light pen 20 has a pen axis 38 which is also the axis of the barrel portion 31. Within the rear end of the sleeve 37 is mounted a detector 40. The detector 40 includes a housing 41 having leads 42 connected to circuitry therein. Within the housing 41 is a photodiode which responds to the presence and absence of light to produce electrical signals on the leads 42. Further details of the detector 40 will be described hereinafter. The leads 42 are connected to a suitable circuit 49, which is schematically shown to include an integrated circuit 50 and two resistors 51 mounted on a printed circuit board 52. The circuit 49 is connected by way of wires in a cable 53 to the computer terminal discussed previously.

Also mounted within the cavity 36, toward the front thereof, is a light-generating assembly 60, such assembly 60 including a carrier 61 which is a solid, generally cylindrical body having a frusto-conical bore 62 extending axially therethrough. The smaller end of the bore 62 faces the front of the light pen 20, while the larger end of such bore faces rearwardly. Four cylindrical recesses are provided in the front end of the carrier 61, and are inclined such that their cylindrical axes intersect substantially at the center of the light aperture 35. Within each such recess is mounted a light-emitting diode (LED) 63, the optical axis of each such LED 63 being aligned with the cylindrical axis of the associated recess. Thus, the optical axes of the four LEDs 63 intersect at the light aperture 35.

The optical light pen 20 also comprises a means for focusing light from the LEDs 63 at the light aperture 35. Such means in the embodiments of FIGS. 1 and 2 takes the form of a set of four lenses 70 respectively associated with the four LEDs 63 and mounted on the carrier 61, as shown. Each lens 70 focuses the light from the associated LED 63 at the light aperture 35, thereby increasing the utilization of the light output from each LED 63. A reflective coating on the interior surface 33 or a highly polished interior surface 33 may be provided, to reflect stray light from the LEDs 63 to the light aperture 35.

To minimize certain adverse effect of specular reflection, which will be described hereinafter, there is provided a diffuser 71, which is in the form of a washer. The diffuser 71 is mounted on the LED carrier 61 by means of a rivet 72 having a central opening therethrough.

The optical light pen 20 further comprises a lens assembly 80 consisting of a pair of spaced-apart, biconvex lens elements 81 and 82 disposed in the sleeve 37. Cylindrical spacers 83, 84 and 85 are provided to maintain the desired spacing between the lens elements 81 and 82, each such spacer having a cylindrical bore centrally therethrough to accommodate passage of the light rays. The optical axis of the lens assembly 80 is aligned with the pen axis 38. The front end of the spacer 85 is bonded to the rear end of the LED carrier 61, the bore 62 communicating with the bore in the spacer 85.

As the light pen 20 is guided over the bars, light emitted thereby strikes the surface 22. Light is reflected by the spaces of the surface 22 between the bars 23. The reflected light passes through the hole in the rivet 72, through the bore 62 in the LED carrier to the lens assembly 80. The lens element 82 of the lens assembly 80 collimates the reflected light. The lens element 81 receives the collimated light and focuses it onto the photodiode 45. Because the light between the lens elements 81 and 82 is collimated, the space therebetween can be adjusted to accommodate the particular mounting, thereby lending flexibility to the assembly 80. As previously explained, the photodiode 45 converts the alternate presence and absence of light into electrical signals which are processed by the circuit 49.

In an example of the light pen 20, the angle between the optical axis of each LED 63 and the pen axis 38 is 18°. When the light pen 20 is tilted at an angle within the range of about 8°–10° (centered at one half of 18°), there will be a substantial increase in the light reflected by the surface 22 along the axis 38, because the surface 22 is specularly reflective. The increased intensity confuses and/or overloads the circuit 49 associated with the detector 40. The diffuser 71 diffuses the light from the LEDs 63 to minimize the effects of specular reflection when the pen 20 is tilted from 8°–10°.

In such example, each LED is made by RCA under its designation SG1002. Each of the spacers 83, 84 and 85 is constructed of black Delrin; the light aperture 35 is 0.05 inches in diameter; the distance from the light aperture 35 to the front of the lens element 82 is 0.75 inches; the distance from the front of the lens element 81 to the rear of the lens element 82 is 0.375 inches, although such distance is adjustable, and the distance from the rear of the lens element 81 to the detector aperture 48 is 0.765 inches. The effective focal length of the lens assembly is 1.2738 inches. The four surfaces labeled $A_1$ to $A_4$ are aspheric, defined by the following aspheric formula:

$$Z_1 = \frac{K(H^2 - Z_0^2) + 2AH^4}{2(1 - KZ_0)}$$

For the surfaces labeled $A_1$ and $A_4$, $K = 1/R = 1.37500$ and $A = -1.9000$. For the surfaces labeled $A_2$ and $A_3$, $K = 1.37500$ and $A = -0.14640$. Each of the lens elements 81 and 82 has a thickness of 0.100 inches. Each lens element has a refractive index of 1.490 and a dispersion of 57.4.

Turning now to FIGS. 4 and 5, further details of the detector 40 will be described. Within the housing 41 (FIG. 1) is mounted a substrate 44 which may be made of ceramic. Mounted on the substrate 44, approximately centrally thereof, is a photodiode 45 constructed of semiconductor material 46 and a plating 47. Etched into the plating 47 is a tiny aperture 48 through which light is admitted to the semiconductor material 46. The front of the housing 41 is a window 43 which enables light provided by the lens assembly 80 to pass into the detector 40, through the aperture 48 and into the semiconductor material 46. The detector 40, partially shown in FIGS. 4 and 5, is an improvement over presently available light detectors. In this improved form, the aperture 48 is actually etched into the plating 47 of the photodiode 45, in contradistinction to the usual approach of providing an apertured disc positioned in front of the photodiode.

In an example of the detector 40, the window 43 is about 0.04 inches thick; the semiconductor material 46 is about 0.01 inches thick and is square, measuring 0.057 inches on a side. The plating 47 is gold, and the aperture 48 is round, measuring 0.004 inches in diameter.

The optical light pen 20 is substantially selfcontained, partly in that it contains the circuit 49 for processing the optical information received by the detector 40. Since the LEDs require minimum power to operate, the pen 20 need not contain a special power source.

A particular advantage of the embodiment is the placement of the LEDs 63 near the front of the pen 20 and the detector 40 substantially rearwardly, thereby substantially precluding scattered light impinging the detector 40 directly from the LEDs 63. This is desirable in order to assure optimum contrast.

It is important that the image formed on the photodiode 45 be in focus, so that the detector 40 is capable of resolving the widths of the bars 23 and the spaces between them, which define the coded information. In other words, if focus is not maintained, two bars which are narrow and are close together may appear to the detector as one such bar, thereby creating error. If the image becomes unfocused, the boundaries of the bar 23 become more diffuse.

It is also important that the image formed on the photodiode 45 remain in focus for positions of the optical light pen 20 other than with its axis 38 perpendicular to the imprinted surface 22. Typically, a user will be more comfortable when the pen 20 is tilted. It has been determined that almost all users are comfortable when the pen is tilted at an angle within the range 0° to 45°. Tilting the pen 20 increases the distance between the surface 22 and the detector 40. At 45°, such distance is increased by an amount equal to one half the diameter of the tip 34 (or the diameter of the light aperture 35, since the tip 34 and the light aperture 35 are about the same size). Considering D as the total change in object distance, and taking D/2 as the mean distance, then the object must be resolved over a range of ±D/2, which is thus the depth of focus required of the optical system. It is, therefore, advantageous to keep the diameter of the pen tip 34 as small as possible in order to keep the required depth of focus to a minimum.

The parameters of the lens assembly 80 are selected such that rays from the surface 22 will be focused at the detector 40 when the light pen 20 is tilted $22\frac{1}{2}°$. Because of the above-described depth of focus, the pen 20 can be tilted from 0° to 45° and still be in focus.

Keeping the object distance variation to a minimum is also desirable because of its effect upon the LED images. These images have been superimposed upon one another at the light aperture 35, at the mean focal distance of the system. For other distances, the images will shift in the direction of deviation and, thus, will drift away from the light aperture 35. The images produced by the LEDs 63 are preferably larger than the detector aperture 48 (0.004 inches in diameter), so that a certain amount of this drift is permissible, the limit being reached when a part of each of the LED images just barely covers the light aperture 35. It should be noted that, since the LED images are used merely for illumination, the change in focal distance is not important as far as image quality is concerned; it is only the effect of this change upon image position that is important.

Proper design of the pen tip 34 can reduce the focal distance variation. If the pen tip is rounded to have a radius equal to its thickness, the effect of change in the focal distance will be minimized.

Turning now to FIGS. 6 and 8, a second embodiment of the present invention will be described. FIG. 6 depicts an optical light pen 100 having a cylindrical housing 101 which encloses the pen components. The front of the housing 101 includes an outer shell 102 (FIG. 8), the forward part of which is conically shaped, and terminates in a surface-engaging tip 102a. The housing 101 further includes a inner member 103 which is generally conically shaped and has a frusto-conical reflecting surface 104 which terminates in a light aperture 105 at the tip of the member 103. As an example, the diameter of the light aperture 105 is 0.025 inches. The reflective capability of the surface 104 may be the result of polishing or the addition of a reflective plating.

Mounted within the housing 101, toward the rear thereof, is a substrate 110 which may be made of ceramic. Mounted on the substrate 110, approximately centrally thereon, is a photodiode constituting a detector 111 which may have a construction like the photodiode 45 in the first embodiment. The detector 111 converts into electrical signals light applied thereto. Such electrical signals are connected by wires 112 to an amplifier 113, the output of which amplifier is coupled through wires 114 to external data process devices such as the computer terminals discussed previously.

Also mounted on the substrate 110 at equiangular spaced-apart regions thereon are four light-emitting diodes 120. The LEDs 120 may have a construction identical to the LEDs 63 used in the first embodiment. In order to minimize the amount of light from the LEDs 120 impinging directly on the detector 111, it is preferable that such detector be located slightly rearwardly of the LEDs 120. Another approach to this problem is to mount the detector 111 on the rear of the substrate 110, and form a hole in the substrate aligned with the detector 111.

To focus onto the light aperture 105 light from the LEDs 120, there is provided a symmetrical lens assembly 130 operating at unit magnification, including four lens elements 131, 132, 133 and 134. The lens elements 131 and 132 are in juxtaposition and are located in front of the substrate 110. Lens elements 133 and 134 are also in juxtaposition and are located in front of the lens elements 131 and 132. The lens elements 131-34 direct light from the LEDs 120 onto the reflecting surface 104. Such surface focuses the light rays at the light aperture 105.

The optical light pen 100 is used in a fashion similar to the pen 20, in that the tip 102a of the pen 20 is brought into contact with the imprinted surface 22, whereupon light focused at the light aperture 105 by the reflecting surface 104 strikes the surface 22 and reflects light therefrom. Such reflected light is directed to the lens elements 133 and 134 and is collimated thereby. The lens elements 131 and 132 receive the collimated light and focus such light at the detector 111.

In the manner previously explained with respect to the detector 40, the detector 111 converts the light intensity changes resulting from presence and absence of the bars 23 into corresponding electrical signals. Such electrical signals are processed as previously described.

The lens assembly 130 has an optical axis 135 which passes through the center of the lens elements 131-34, through the center of the detector 111, and through the center of the light aperture 105. FIG. 8 depicts light emanating from one of the four LEDs 120, that is, one below the optical axis 135. Since the lens assembly 130 is symmetrical, light emanating from such LED 120 would be focused onto the imprinted surface 22 a corresponding distance above the optical axis 135. Similarly, light from the two LEDs 120, above the optical axis 135 would be focused onto the imprinted surface 22 below the optical axis 135. However, the reflecting surface 104 serves to deflect the light and redirect it, so that it is focused at the light aperture 105. How this occurs may be better understood by reference to FIG. 9.

FIG. 9 depicts three rays 142, 143 and 144 exiting from the lens element 134. The ray 142 is at an angle of about 8½° below the optical axis 135 and corresponds to the ray 142' (FIG. 8) from one of the LEDs 120. Without the reflective surface 104, the ray 142 would strike the imprinted surface 22 at the point 146, as represented by the dashed extension 142a. The rays 143 and 144 are other rays within the field angle of the lens assembly 130, which would, without the surface 104, focus at the point 146, as respectively represented by the dashed lines 143a and 144a.

When the reflecting surface 104 is interposed at an angle of 8½°, as shown, the rays 142-144 respectively strike the surface 104 at the points 142b-144b. The rays 142-144 are reflected from the reflecting surface 104 at angles equal to the angles of incidence with the surface 104 respectively, as rays 142c-144c, all focusing on the imprinted surface 22 at the point 147. The point 147 is substantially at the center of the light aperture 105. A fourth ray (not shown) within the field angle of the lens assembly 130, but at an angle of about 5° above the axis 135, is reflected by the reflecting surface 104 as a ray 145c which is also focused at the point 147. The dashed line 145a shows the path of the corresponding ray, without the surface 104.

The ray 142 strikes the reflecting surface 104 very near its forward end, that is, about 0.05 inches from the light aperture 105. However, the ray 144 which is at about 3° above the optical axis 135, strikes the reflecting surface more rearwardly. A ray at the other extreme, about 8.5° above the axis 135, would strike the reflecting surface 104 near its rearmost end, that is, very near the lens element 134.

A similar analysis of the other LED 120 below the optical axis 135 will yield a similar result, in that rays therefrom will be focused at the point 147. Analyzing both LEDs 120 above the optical axis 135 in a similar fashion will show that their rays are similarly focused at the point 147.

Turning now to FIG. 10, the rays which strike the imprinted surface 22 will be reflected therefrom, and will be collimated by the lens elements 133 and 134, which collimated light is focused by the lens elements 131 and 132 onto the detector 111. In the manner previously described, the detector 111 produces electrical signals representative of the coded information present on the imprinted surface 22.

Figure 7:
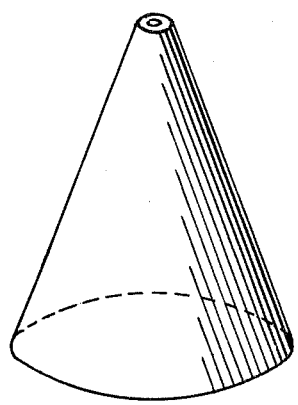
FIG. 7 is a perspective view of a solid, transparent, frusto-conical body as an alternative to the front end of the optical light pen of FIG. 6.

FIG. 7 depicts a solid transparent cone which could be substituted for the member 103 (FIG. 8). Such solid cones would redirect or focus the light at the light aperture 105, but by refraction at the base of the cone and interior reflection at the conical surface of the cone. It is also possible to use a plano mirror for each LED, to focus the light therefrom at the light aperture 105.

In an example of the light pen 100, the detector 111 has a circular sensing area 0.004 inches in diameter. Each LED 120 is square, measuring approximately 0.015 inches on a side. The four LEDs 120 are arranged at the four corners of a chip measuring 0.057 inches diagonally.

The semivertical angle 140 between the reflecting surface 104 and a cylinder defined by the optical axis 135 is determined by the amount of displacement of the LEDs from the optical axis 135. With the above dimensions and positions of the LEDs 120, the angle 140 is about 8.2°. The inside diameter at the end of the surface 104 nearest the lens element 134 is 0.240 inches and tapers to 0.042 inches inside diameter at the smallest end, a distance of 0.686 inches from the lens 134. The less the LEDs 120 are displaced from the optical axis 135, the less the image shift for varying tilt angles of the optical pen and also the smaller the angle 140. If the LEDs were directly on the axis 135, then the reflecting surface 104 would not be needed. In view of this consideration, a transparent conical refracting element such as is shown in FIG. 7, would not be as desirable as the reflecting surface depicted in FIGS. 6 and 8.

The following table sets forth the parameters of one example of the lens assembly 130. The elements are designated in the first column, the corresponding refractive indices N and the abbe number are given in the second and third columns respectively, the radii of curvature, as identified on the drawing, in the fourth column, the thicknesses in the fifth column and the air spaces in the last column. The + and the − values of the radii denote surfaces respectively convex and concave to the rear of the pen 100. The effective focal length of the lens assembly 130, in this example, is 1.3036.

| Lens Elements | N | Abbe Number | Radii (inches) | Thicknesses (inches) | Air Spaces (inches) |
|---|---|---|---|---|---|
| 131 | 1.785 | 26.1 | $R_1 = 0.5720$ | $t_1 = 0.039$ | $s_1 = .7299$ |
|  |  |  | $R_2 = 0.3311$ |  | $s_2 = .005$ |
| 132 | 1.588 | 61.2 | $R_3 = 0.3560$ | $t_2 = .082$ |  |
|  |  |  | $R_4 = -0.8800$ |  | $s_3 = .9864$ |
| 133 | 1.588 | 61.2 | $R_5 = 0.8800$ | $t_3 = .082$ |  |
|  |  |  | $R_6 = -0.3560$ |  | $s_4 = .005$ |
| 134 | 1.785 | 26.1 | $R_7 = -0.3311$ | $t_4 = .039$ |  |
|  |  |  | $R_8 = -0.5720$ |  | $s_5 = .742$ |

As in the first embodiment, the light pen 100 is substantially self-contained and the surface 22 is in focus up to a 45° inclination of the pen 100. Similar remarks made in respect to the first embodiment as to the selection of the size of the light aperture 105 and design of the tip are equally applicable to this embodiment.

It is believed that the invention, its construction and operation, and its advantages should be readily understood from the foregoing without further description, and it should also be manifest that, while preferred embodiments of the invention have been shown and described for illustrative purposes, the details as to structure are nevertheless capable of wide variation within the purview of the invention as defined in the appended claims.

What is claimed is:

1. An optical light pen for reading information imprinted on a surface, comprising an elongated housing having means defining a light aperture at one end thereof, said housing being adapted to be positioned so that said light-aperture-defining means is in contact with the imprinted surface and is movable therealong, detector means in said housing for producing electrical signals in response to and in accordance with light received thereby, a plurality of light-emitting diodes in said housing, means for directly generally toward said light aperture the light from said light-emitting diodes, whereby in use light from said light-emitting diodes will be focused onto the coded information on the imprinted surface, and lens means in said housing for focusing onto said detector means light reflected by the imprinted surface, said lens means including first and second lens elements, the space between said detector means and said first lens element being 0.765 inches, the space between said lens elements being 0.375 inches, and the space between said second lens element and said light aperture being 0.75 inches, each of the surfaces of said lens elements being defined by the aspheric formula $$\frac{K(H^2 - Z_0^2) + 2AH^4}{2(1 - KZ_0)}$$

wherein H is the variable along the ordinate axis, $Z_0$ is the variable along the abscissa axis, $K = 1.37500$ and $A = 1.9000$ for the surfaces respectively nearest said detector means and said light aperture, and $K = 1.37500$ and $A = -0.14640$ for the facing surfaces of said lens elements, each of said lens elements having a thickness of 0.100 inches, a refractive index of 1.490 and a dispersion of 57.4.

2. An optical light pen for reading information imprinted on a surface, comprising an elongated housing having means defining a light aperture at one end thereof, said housing being adapted to be positioned so that said light-aperture-defining means is in contact with the imprinted surface and is movable therealong, detector means in said housing for producing electrical signals in response to and in accordance with light received thereby, a plurality of light-emitting diodes in said housing, means for directing generally toward said light aperture the light from said light-emitting diodes, whereby in use light from said light-emitting diodes will be focused onto the coded information on the imprinted surface, and lens means in said housing for focusing onto said detector means light reflected by the imprinted surface, said lens means including first and second and third and fourth lens elements constructed substantially in accordance with the following specifications:

| Lens Elements | N | Abbe Number | Radii (inches) | Thicknesses (inches) | Spaces (inches) |
|---|---|---|---|---|---|
| First | 1.785 | 26.1 | $R_1 = 0.5720$ | $t_1 = .039$ | $s_1 = .7299$ |
|  |  |  | $R_2 = 0.3311$ |  |  |
| Second | 1.588 | 61.2 | $R_3 = 0.3560$ | $t_2 = .082$ | $s_2 = .005$ |
|  |  |  | $R_4 = -0.8800$ |  |  |
| Third | 1.588 | 61.2 | $R_5 = 0.8800$ | $t_3 = .082$ | $s_3 = .9864$ |
|  |  |  | $R_6 = -0.3560$ |  |  |
| Fourth | 1.785 | 26.1 | $R_7 = -0.3311$ | $t_4 = .039$ | $s_4 = .005$ |
|  |  |  | $R_8 = -0.5720$ |  |  |
|  |  |  |  |  | $s_5 = .742$ | in which the first column lists the lens elements from the rear of said light pen to its front, the second column lists the refractive indices respectively for said lens elements, the third column lists the abbe numbers respectively for said lens elements, the fourth column lists the radii of curvature $R_1$ - $R_8$ of the surfaces of said lens elements numbered from the rear of said pen to the front thereof, the + and − values of the radii R denoting surfaces convex and concave to the rear of said pen, the fifth column lists the thicknesses $t_1$ to $t_4$ respectively of said lens elements, the sixth column lists the space $s_1$ between said detector means and the rear of said first lens element, the space $s_2$ between said first and second lens elements, the space $s_3$ between said second and third lens elements, the space $s_4$ between said third and fourth lens elements, and the space $s_5$ between said fourth lens element and said light aperture.

3. An optical light pen for reading information imprinted on a surface, comprising an elongated housing having a frusto-conical interior reflective surface in the region of one end thereof terminating in a light aperture at the tip of said end, said housing being adapted to be positioned so that said tip is in contact with the imprinted surface and is movable therealong, detector means in said housing for producing electrical signals in response to and in accordance with light received thereby, a plurality of light-emitting diodes in said housing and disposed near said light aperture and arranged circumferentially about a central opening, a corresponding plurality of lenses respectively disposed in front of said diodes for directing generally toward said light aperture the light from said light-emitting diodes, said reflective surface being constructed and arranged for directing toward said light aperture stray light passing through said lenses, whereby in use light from said light-emitting diodes will be focused by said lenses and reflected by said reflecting means onto the coded information on the imprinted surface, light-diffusing means disposed between said light-emitting diodes and said light aperture, and lens means in said housing for focusing onto said detector means light reflected by the imprinted surface and passing through said central opening.

* * * * *